May 3, 1949.
W. G. MARTIN
2,469,123
APPARATUS FOR PROGRESSIVELY ENAMELING
CONTINUOUS METAL SHEETING
Filed Jan. 20, 1945
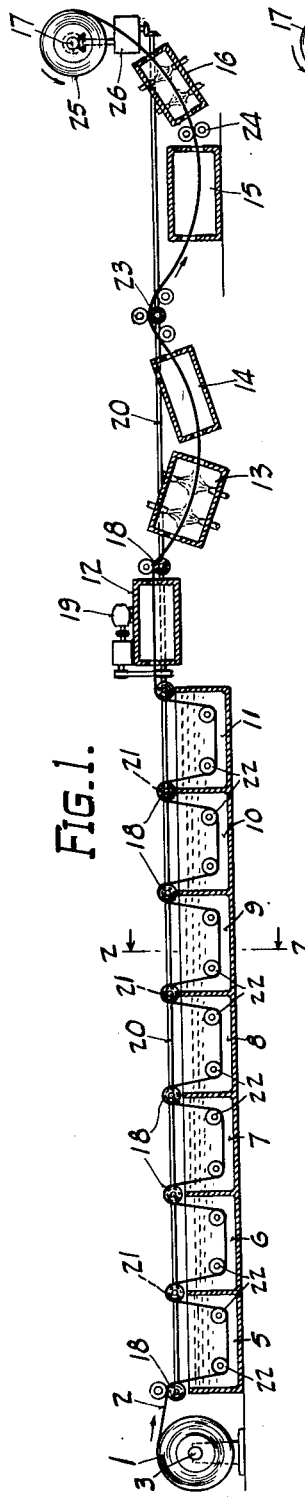
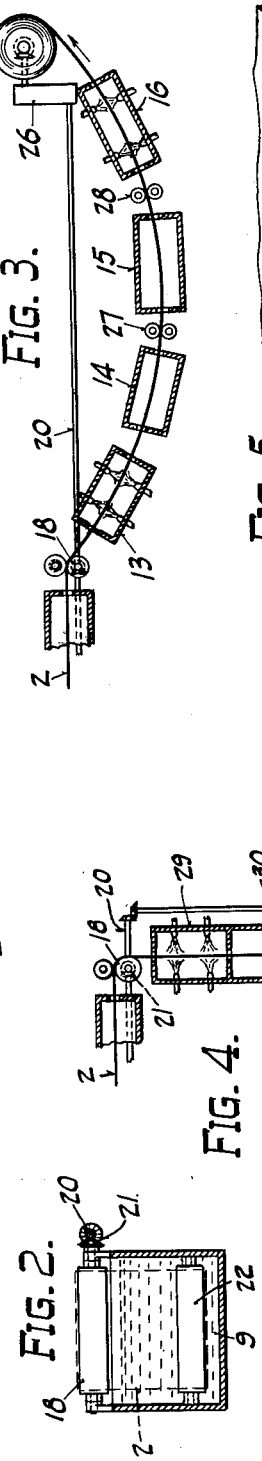
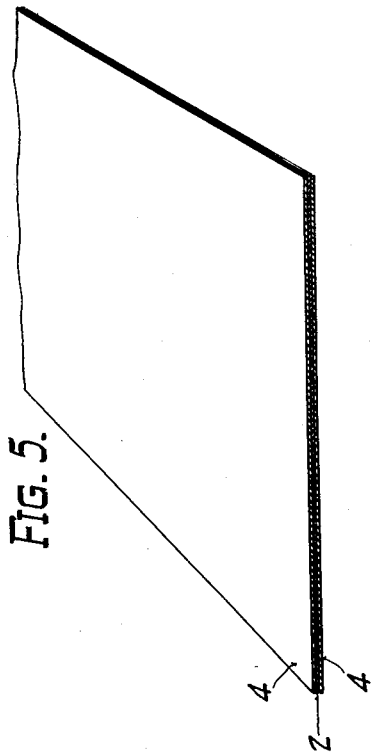
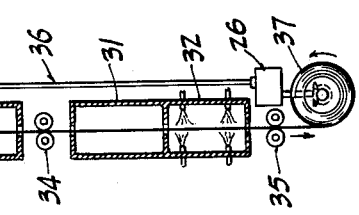
INVENTOR.
Wesley G. Martin
BY
ATTORNEY.

Patented May 3, 1949

2,469,123

UNITED STATES PATENT OFFICE 2,469,123

APPARATUS FOR PROGRESSIVELY ENAMELING CONTINUOUS METAL SHEETING

Wesley G. Martin, Milwaukee, Wis., assignor to A. O. Smith Corporation, Milwaukee, Wis., a corporation of New York Application January 20, 1945, Serial No. 573,759

2 Claims. (Cl. 91—13)

1

This invention relates to a method and apparatus for progressively enameling a continuous metal sheet or sheeting and has particular reference to the progressive cleaning and coating with ceramic enamel of a continuous sheet or sheeting of metal that is sufficiently pliable to be coiled readily after enameling, for future additional fabricating operations.

Under prior practices ceramic enamel has been applied to sheets of metal that were of a thickness to render them generally inflexible. This practice of applying the enamel to thick generally inflexible metal sheet did not lend itself to the enameling of a continuous sheet of metal due to handing and storage difficulties.

One of the objects of the invention is to provide a method of enameling a substantially continuous sheet of metal of such thinness and pliability that the sheet may be readily coiled after enameling is completed.

Another object is to provide a progressive method of enameling a continuous thin sheet that presents the same as a finished product for fabricating operations without interruption of the several cleaning and enameling stages.

Another object is to provide a method of enameling thin, flexible metal sheet of substantially continuous extent without injury to the enamel.

A further object is to provide a method of enameling thin, flexible metal sheet of practically continuous extent that is self-supporting without breaking the sheet during fusing of the enamel at temperatures that substantially decrease the tensile strength thereof.

A further object is to provide a method of coating a substantially continuous metal sheet of extreme thinness but still of a thickness sufficient to make the sheet self-supporting without breaking even though the tensile strength of the thin sheet is substantially reduced by heating to the fusing temperatures of the ceramic enamel.

Another object is to provide a method of enameling thin sheet wherein the sheet is supported during enameling by its own tensile strength.

A further object is to provide a method of enameling a thin substantially continuous sheet of metal at low cost and high volume production.

A further object is to provide efficient apparatus for enameling thin metal sheet of substantially continuous extent for volume production thereof.

Another object is to provide a method of progressively enameling a continuous sheet that is accomplished without intermittent handling.

Another object is to employ apparatus in enameling thin metal sheet that provides a continuous line production and a progressive method of preparing, enameling and coiling the sheet for further fabricating operations.

The invention, in general, is directed to coating metal sheets or sheeting that have been formed to a thinness of an order to make the same substantially flexible after the same has been coated with enamel and for readily running the sheeting through the apparatus employed under the method of the invention for cleaning the metal sheeting and coating the same with ceramic enamel. The method employed is directed to running substantially continuous metal sheeting of the desired width and thickness off from a coil and through cleaning, glass slip application and firing furnace operations, continuously and progressively and then recoiling the same for further fabricating operations.

Other objects and advantages of the invention will appear in connection with the following description and drawings illustrating several embodiments of a method of carrying out the invention.

In the drawings:

Figure 1 is a diagrammatic view illustrating one method of carrying out the invention;

Fig. 2 is an enlarged section taken on line 2—2 of Figure 1;

Fig. 3 is a diagrammatic view illustrating another method of carrying out the invention the portion beyond the dryer only being shown;

Fig. 4 is a diagrammatic view similar to Fig. 3, illustrating still a further method of carrying out the invention; and Fig. 5 is an enlarged perspective view of a portion of a finished sheet.

In carrying out the invention in accordance with the illustration of Figure 1, a coil 1 of metal sheet 2 is located on the spindle 3 to be uncoiled for cleaning and then coating with ceramic enamel 4.

Upon being unwound from the coil 1 the sheet 2 passes horizontally in the order named through an alkaline tank 5, a rinse tank 6, an acid tank 7, rinse tanks 8 and 9, a neutralizer tank 10, a rinse tank 11 and a dryer 12. These parts of the equipment layout clean the metal sheet and prepare the same for the application and fusing of the ceramic enamel 4 thereto and are the same for each of the three embodiments shown.

After leaving dryer 12, the metal sheet 2 passes through, in the order named, an enamel spray booth 13, dryer 14, firing furnace 15, quenching zone 16 and thence to coiler spindle 17 where the sheet is recoiled. In these parts of the apparatus the ceramic enamel 4 is applied and bonded preferably to both sides of the metal sheet 2. It may be desirable in some instances, however, to apply the enamel to only one side of the sheet.

An alkali cleaning solution is provided in tank 5, which removes oil and grease from sheet 2 by chemical action. The rinse tank 6 is filled with flowing water which rinses off the cleaner solution adhering to sheet 2.

The acid tank 7 contains a pickling bath having a temperature from 140° to 150° F. and serves to dissolve rust on the sheet and remove scale therefrom. In the course of the metal sheet 2 through the rinse tanks 8 and 9 after leaving acid tank 7 the excess acid remaining on the sheet is dissolved and carried off.

The neutralizer tank 10 contains a neutralizing chemical bath at a temperature from 150° to 160° F. that neutralizes or removes any acid that may remain on the sheet 2 after washing. Prior to passage through dryer 12 which circulates hot air into contact with the sheet 2 to rapidly dry the same the sheet is again subjected to the rinse of flowing water in the rinse tank 11 to wash off the neutralizer of tank 10.

Depending upon the condition of the steel surface of sheet 2 cleaning methods such as wet chlorine gas pickling may be found desirable as a substitute for the method described. A nickel strike or flash treatment may be employed after the acid bath to give the sheeting a thin coating of nickel to improve the adherence of the enamel thereto.

The driving mechanism to drive sheet 2 through the cleaning and enameling equipment described, is preferably located in the cleaning portion of the apparatus in order to eliminate contact with the enamel after the coating is applied.

The sheet 2 is driven by a plurality of synchronized rolls 18 in turn driven by the motor 19 through drive shaft 20 and the bevel gears 21 connecting each roll 18 to the drive shaft. The rolls 18 are located between each tank and at the outer upper ends of the alkaline tank 5 and the last rinse tank 11. In addition a pair of idler rolls 22 are disposed at the bottom of each of the tanks 5, 6, 7, 8, 9, 10 and 11 respectively in spaced horizontal relation. The sheet 2 in its course through the cleaning apparatus passes over the rolls 18 located at the top of the tanks and under the rolls 22 disposed within each tank.

The last drive roll 18 over which the sheet 2 passes is located at the exit side of the dryer 12. After passing over this roll the sheet 2 travels in a generally downward course through the slip spray booth 13 where the enamel 4 in slip form is applied preferably to both the bottom and the top of the sheet. The application of the enamel slip may be carried out by a cluster of atomizing spray guns so located as to uniformly spray the slip on the sheet 2 as it passes through the spray booth.

The enamel 4 may also be applied to the sheet by slushing or immersion of the sheet in the enamel slip.

The metal sheet 2 next moves through the dryer 14 and into the firing furnace 15 where it is subjected to the proper fusing temperature for sufficient time to fuse or mature the enamel and bond the same to the metal sheet. The furnace 15 may be of either the electric or combustion type and it is possible that the sheet 2 may be heated directly by electric resistance or induction methods with the employment of whatever frequency is the most suitable and economical.

Additional control over the enamel coating operation may be secured by designing the furnace 15 in a manner to control the atmosphere around the sheet 2 immediately before and during the fusing operation as described and claimed in Patent No. 2,004,632, by the present inventor. The entrance and exit openings of furnace 15 may be of the smallest dimensions to keep air out and yet permit free movement of the sheet 2 through the furnace without contact therewith.

In the embodiment of the invention illustrated in Figure 1 the driving rolls 23 are disposed between the dryer 14 and the furnace 15 at a substantial distance above the ordinary horizontal line of travel of the sheet 2 from the dryer to the furnace and are driven in synchronization with rolls 18 by the drive shaft 20 through the bevel gears 21. The sheet 2 therefore takes an upward course from dryer 14 to a plurality of rolls 23 and thence a downward course to furnace 15. The rolls 23 may be covered with felt or the like to provide a resilient contact between the enamel and the rolls to protect the bisque enamel.

The coiler spindle 17 may be located far enough beyond furnace 15 to enable sufficient cooling of the glass before the sheet 2 is recoiled thereon. It is preferred after leaving furnace 15 that sheet 2 pass through the quenching zone 16 on an upward course of travel to spindle 17.

The sheet 2 is guided upwardly after leaving furnace 15 by the rolls 24 which may be covered with asbestos or the like. Rolls 24 merely operate as steadying rolls and may be located in the quenching zone 16 or prior to the entry thereto.

In the quenching zone 16 the sheet 2 is sprayed with a fine mixture of air and water to more rapidly bring the sheet and the enamel coating 4 to room temperature.

The quenching of the sheet 2 may be varied in accordance with the composition of the metal employed, a different type of quenching and heat treatment being necessary in the case of some high strength alloy steels as compared to low carbon steel.

After coiling metal sheet 2 with the enamel 4 thereon on the spindle 17, the coil 25 may be removed for other fabricating operations. The spindle 17 is rotated by drive shaft 20 through a gear mechanism provided within the compensator 26 which regulates the speed of spindle 17 as the diameter of the coil 25 thereon increases. The spindle 17 is synchronized with the speed of travel of the sheet through the cleaning, spraying and fusing apparatus described and does not exert any pulling force on sheet 2 other than that necessary to properly suspend the sheet during firing.

In the embodiment of the invention described the sheet 2 takes a double catenary course from the drive roll 18 at the exit side of dryer 12 to the spindle 17. This enables the sheet 2 to be supported by its own tensile strength within furnace 15 without further support therein and even though the sheet is subjected to the fusing temperatures of the enamel which considerably decreases the tensile strength thereof. The extent or length of sheet 2 that may be supported by the tensile strength of the same depends upon the composition of metal employed.

In the modified embodiment of the invention illustrated diagrammatically in Fig. 3 a pair of felt covered steadying rolls 27 are located between dryer 14 and furnace 15 at a line the metal sheet 2 would ordinarily follow if freely suspended between coil spindle 17 and the drive roll 18 at the exit side of dryer 12. The metal sheet 2 in this embodiment of the invention is suspended in a single catenary and is supported in furnace 15 by its own tensile strength. After leaving the furnace the sheeting 2 passes through a pair of asbestos rolls 28. Here both the rolls 27 and 28 operate merely as steadying or guide rolls. Spindle 17 is driven in synchronization by the drive shaft 20. The compensator 26 is also employed here as in the embodiment of Figure 1.

In still another embodiment of the invention illustrated in Fig. 4, the enamel applying, fusing and cooling apparatus is disposed on a vertical plane but in the same order as shown in Figs. 1 and 3.

In the embodiment of Fig. 4, the sheet 2 after passing over the last drive roll 18 is directed downwardly through spray booth 29, dryer 30, furnace 31, quenching zone 32 and thence to the coil spindle 33. The construction of these parts is similar to that of the other embodiments except that furnace 31 is substantially varied due to its vertical position.

A pair of steadying rolls 34 may be disposed between the dryer 30 and furnace 31. The rolls 34 are preferably felt covered similar to rolls 23 and 27. In addition supporting rolls 35 covered with asbestos or the like may be located between the quenching zone 32 and spindle 33. Spindle 33 is driven by shaft 36 through gears 37 and shaft 36 is in turn driven by shaft 20 of the embodiment shown in Figure 1. The compensator 26 is also employed as previously described.

The weight of the sheet 2 pulls the same straight through the spraying and fusing zones and the sheet is supported by its own tensile strength. The weight of the sheet suspended by the heated portion in furnace 31 is at a minimum.

In traveling through the vertical spraying and fusing apparatus of Fig. 4, the sheet 2 passes through the spray booth and furnace on a vertical course. This is particularly an asset with respect to the spray booth since the enamel 4 in slip form at this stage can be readily and uniformly applied to both sides of the sheet.

In all of the embodiments of the invention, as the end of sheet 2 is reached in coil 1 the next sheet to go through the process may be attached to the same or a trailer sheet may be secured thereto to insure that the sheet 2 that is coiled upon spindle 17 will be properly covered with enamel. The trailer sheet may be disposed of or used over again.

The length of sheet 2 on coil 1 depends on the dimensions in the completed coil 25 to be removed from spindle 17 that are desirable for ready handling and storage. Also there must be considered the use to which the enamel sheet is to be put and the requirements of low cost mass production.

The dimensions of the apparatus employed will depend on the speed of production and the composition of the steel and enamel that is utilized.

For example assume that it takes sixty seconds to properly fuse the enamel 4 in the firing furnace. Also assume that the sheet will be driven through the equipment including the furnace at the speed of ten feet per minute. This will require the firing zone of the furnace to be ten feet long in order to accomplish the required fusing. These same calculations should be made on all the equipment employed to insure that the sheet 2 is given the proper treatment throughout to produce the completed product desired.

The calculations in turn differ with the composition and thickness of the enamel 4 that is employed and also with the composition and thickness of the steel.

In any of the embodiments of the invention, should it be desirable to coat the sheet 2 with more than one coating of enamel, the sheet 2 is successively progressed through the enamel applying and fusing portion of the equipment, or additional enamel applying and fusing apparatus is provided in line with that described and through which the sheet passes before reaching spindles 17 or 33.

The invention provides a progressive method of coating an extremely thin sheeting of metal of substantially continuous extent with ceramic enamel for use in numerous commercial endeavors. The flexibility of the product enables the same to be handled in coiled form that results in low cost production and inexpensive handling charges. By employing the tensile strength of the sheet to support the sheet during application of the enamel and fusing of the same to the metal it is possible to progressively enamel extremely thin metal sheeting without injury to the enamel.

Instead of coiling the sheeting after the same comes out of the quenching apparatus or zone it may be desirable to cut the sheeting into predetermined lengths for commercial use in such lengths rather than coiling the sheeting and later unwinding it from the coil and cutting the same to the dimensions desired.

Various embodiments of the invention may be employed within the scope of the accompanying claims.

I claim:

1. In apparatus for the progressive enameling of a continuous metal sheet, a pair of coil supports spaced apart a substantial distance, cleaning apparatus, a spray booth, a dryer, a firing furnace and quenching equipment disposed in the order named between said coil support, drive rolls disposed in conjunction with said cleaning apparatus and the enamel applying, fusing and quenching equipment to drive the sheet through the same and clean and coat the sheet with enamel, rolls having a resilient covering and disposed between the dryer and firing furnace to steady said sheet in its forward moving path, and asbestos covered rolls provided between the firing furnace and the coil support on which the enameled sheet is wound to additionally steady the sheet in its course to said last named coil support.

2. In apparatus for the progressive enameling of a continuous metal sheet driven at a predetermined rate, cleaning apparatus disposed on a horizontal plane and adapted to clean and prepare said sheet for enameling, enamel applying, firing and cooling equipment provided on a vertical plane in the order named adjacent said cleaning apparatus, and means to drive said sheet through said cleaning apparatus on a horizontal course and thence through the enamel applying, firing and cooling equipment on a vertical course.

WESLEY G. MARTIN.

REFERENCES CITED

The following references are of record in the file of this patent:

UNITED STATES PATENTS

| Number | Name | Date |
|---|---|---|
| 1,035,242 | Russell | Aug. 13, 1912 |
| 1,230,958 | Warga | June 26, 1917 |
| 2,259,935 | Johnson | Oct. 21, 1941 |
| 2,311,616 | Gordon et al. | Feb. 16, 1943 |
| 2,365,761 | Hunter | Dec. 26, 1944 |
| 2,378,758 | Ekstrom | June 19, 1945 |

FOREIGN PATENTS

| Number | Country | Date |
|---|---|---|
| 116,361 | Great Britain | 1918 |